Figure 1:
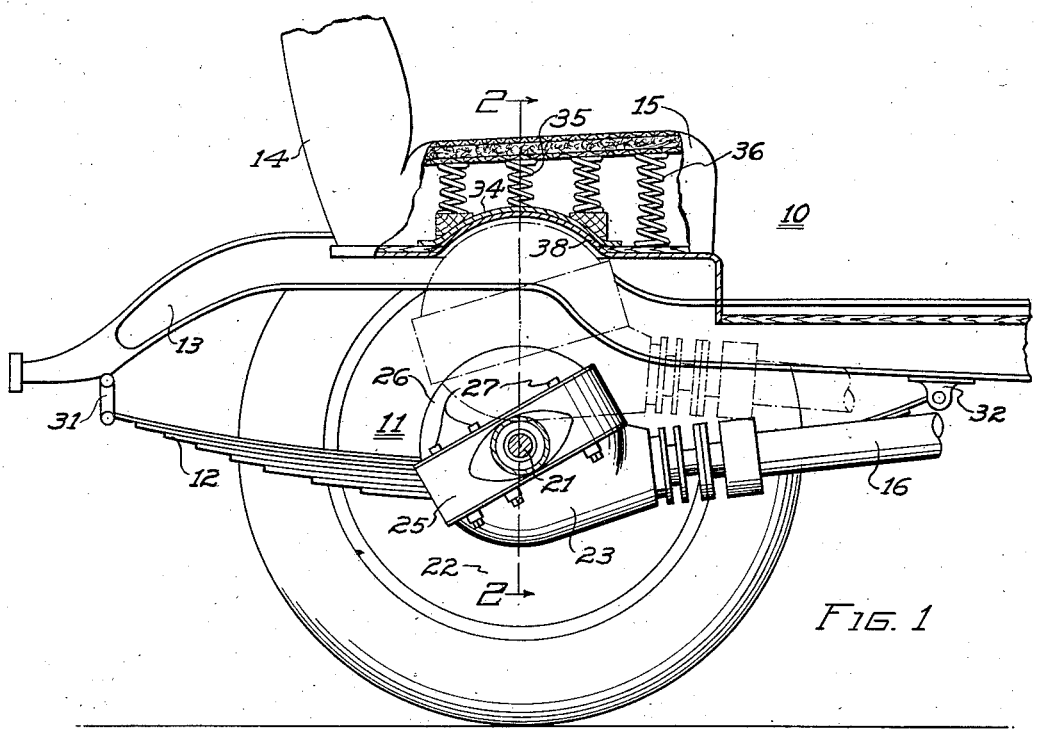

July 9, 1935. J. G. VINCENT 2,007,413

MOTOR VEHICLE

Filed Sept. 26, 1930

Inventor
JESSE G. VINCENT
By Mullan-Tibbs
Attorney

Patented July 9, 1935

2,007,413

UNITED STATES PATENT OFFICE 2,007,413

MOTOR VEHICLE

Jesse G. Vincent, Detroit, Mich., assignor to Packard Motor Car Company, Detroit, Mich., a corporation of Michigan Application September 26, 1930, Serial No. 484,516

5 Claims. (Cl. 296—63)

My invention relates to motor vehicles and has particular relation to the arrangement and construction of the parts of such vehicles.

In the construction and operation of motor vehicles it is desirable, from the standpoints of utility and appearance, that the body of the vehicle be as low as possible. At the same time it is necessary that certain clearances, such as road clearances and the clearance between the body and axles be maintained or increased.

My invention is intended to solve these problems and an object of the invention is the provision of means for lowering the body of a motor vehicle without decreasing the clearance between the axles and the body.

Another object of my invention is to provide a motor vehicle construction which will permit of an increase in clearance between the axles and body without correspondingly increasing the height of the vehicle.

Another object of my invention is to provide a vehicle construction in which a portion of a rear axle structure may telescope within a seat cushion when the springs are flexed.

Another object of my invention is to reduce the volume of space occupied by the drive gear housing.

Figure 2:
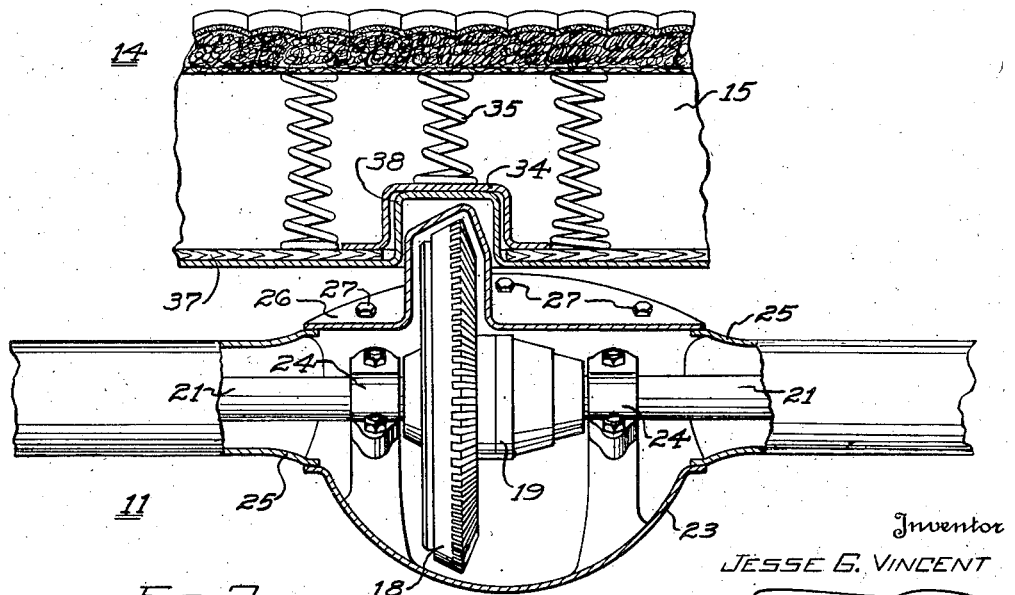

Other objects of my invention will become apparent from the following description of my invention taken in connection with the drawing in which:

Figure 1 is a view, partly in elevation and partly in section, of a portion of a motor vehicle to which my invention has been applied, and Fig. 2 is a view, partly in elevation and partly in section, of the rear axle and rear seat of the vehicle shown in Fig. 1, taken substantially along the line 2—2 except that the axle is shown in the position (indicated by the dotted lines in Fig. 1) it occupies when the suspension springs are fully flexed.

Referring to the drawing, the motor vehicle is represented generally by the number 10 and includes a rear axle 11, suspension springs 12, frame 13, body 14 and seat cushion 15. Power for driving the vehicle is transmitted from the motor (not shown) by means of the drive shaft 16 which is operatively connected to the motor and to the driving pinion (not shown) utilized in driving the ring gear 18. The usual differential gearing 19 is attached to the ring gear 18 and the differential gearing is in operative engagement with the driving axles 21 to which the wheels 22 are attached.

Any suitable arrangement and mounting of drive gearing may be utilized but in the construction shown the driving pinion is preferably located within and supported by the carrier 23 and the inner ends of the axles 21, the ring gear 18 and the differential gearing are supported by bearings 24, which constitute a part of the carrier. The outer ends of the axles 21 are supported by bearings (not shown) in the "banjo" or "drum" housing 25. An inspection cover 26, comprising essentially a disc having a semi-circular upstruck portion adapted to conform to the ring gear which it houses, is fastened to the drum housing by means of bolts 27, or the like. This construction of the inspection plate materially reduces the space required by the rear axle.

The rear of the vehicle body 14 is preferably suspended over the axle by means of suspension leaf springs 12 engaged at their ends to the frame 13 by means of hangers 31 and brackets 32, or the like, and at their central portions to the axle housing 25. The frame of the vehicle may be lower than is the customary practice, or the body may be suitably channeled to receive the frame and disposed between the frame members to permit a lower position of the body.

If the body is lowered it is necessary to maintain the proper clearance between the axle and the body in order that the axle will not strike the frame or body when the wheels strike a bump or the like. I provide for maximum upward movement of the axle by providing an upwardly extending recess in the underneath side of the seat cushion directly above the axle, adapted to receive the axle when the suspension springs are flexed upwardly to a considerable degree such that the housing is in an upper position shown in dotted lines of Fig. 1 and in full lines in Fig. 2.

In the present case this recess in the seat cushion is defined by a semi-cylindrical housing or cap 34 which is fastened to the seat cushion frame and projects into the seat. The upper face of the cap 34 may be provided with means for fastening the coil springs 35 of the cushion to it. The springs 35 may be shorter than the remaining springs 36 or may be compressed to a greater extent to prevent "bottoming" of the springs. The seat support 37 may also have a housing or cap 38 which fits in the seat cushion housing 34 and coacts with it to form a recess for the ring gear part of the rear axle.

Of course the seat cushion recess may be dome-shaped or of any other desirable shape suitable to receive any upwardly projecting part or parts of the axle but in the present instance I prefer to utilize a rear axle arranged so that the inspection cover is the part which is uppermost. I prefer to utilize a cover of disc shape having a semi-cylindrical raised portion adapted to house the ring gear. As the semi-cylindrical raised portion constitutes the upwardly projecting portion of the axle and since it is narrow the cap 34 in the cushion is of minimum width and length.

Of course any type of axle or gear housing and seat recess may be utilized but the embodiment described and illustrated has been found very desirable. The full clearance between the axle and the vehicle body may be maintained, yet the body of the vehicle may be lowered. Obviously, if desired, the body height may be the same as heretofore but an increased clearance secured. The upstruck portion of the housing cover is of a minimum thickness and length and the housing occupies a minimum of space.

Although I have described a certain preferred embodiment of my invention it is apparent that modifications thereof may be made. Such modifications may be made without departing from the spirit and scope of my invention as set forth in the appended claims.

1. In a motor vehicle provided with a spring mounted gear housing having a carrier, a drum housing and a cover of a minimum transverse thickness arranged so that the cover is the uppermost of the housing members; a vehicle body, and a seat structure, said body and said seat structure being provided with telescoping recesses immediately above the gear housing for the telescopic reception of the housing cover when the springs are flexed.

2. In a motor vehicle having a body and an axle housing associated to move relatively in a vertical plane, said housing having an upstanding portion, a seat structure in the body above the axle housing, said body and seat structure having portions into which the upstanding housing portion can move, and wall means protecting the interior of the seat structure from the upstanding axle housing portion.

3. In a motor vehicle having a body and an axle structure relatively movable, said axle structure having an upstanding differential housing, a seat structure supported in the body above the axle structure, wall means extending into the bottom portion of the seat structure providing a recess into which the upstanding portion of the axle housing can move, and spring means in the seat structure including coil springs resting on the top of the wall means and coil springs adjacent the wall means.

4. In a motor vehicle provided with an axle housing including a segmental upstruck portion enclosing a ring gear, and a body having a seat support formed with a recessed bottom wall to allow the segmental upstruck portion of the housing to move above the level of the major portion of the bottom thereof during a portion of relative vertical movement; a seat structure having a recessed wall formed in complementary relation to said seat support recess whereby said segmental upstruck portion of the housing may extend therein.

5. In a motor vehicle having a body and an axle relatively movable, said axle having a differential housing with a narrow upstanding portion, a coil spring seat structure supported by the body above the housing, said seat structure having a portion between two rows of coil springs into which the upstanding portion of the axle housing can move, and wall means protecting the interior of the seat structure from the upstanding portion of the housing.

JESSE G. VINCENT.